Figure 1:
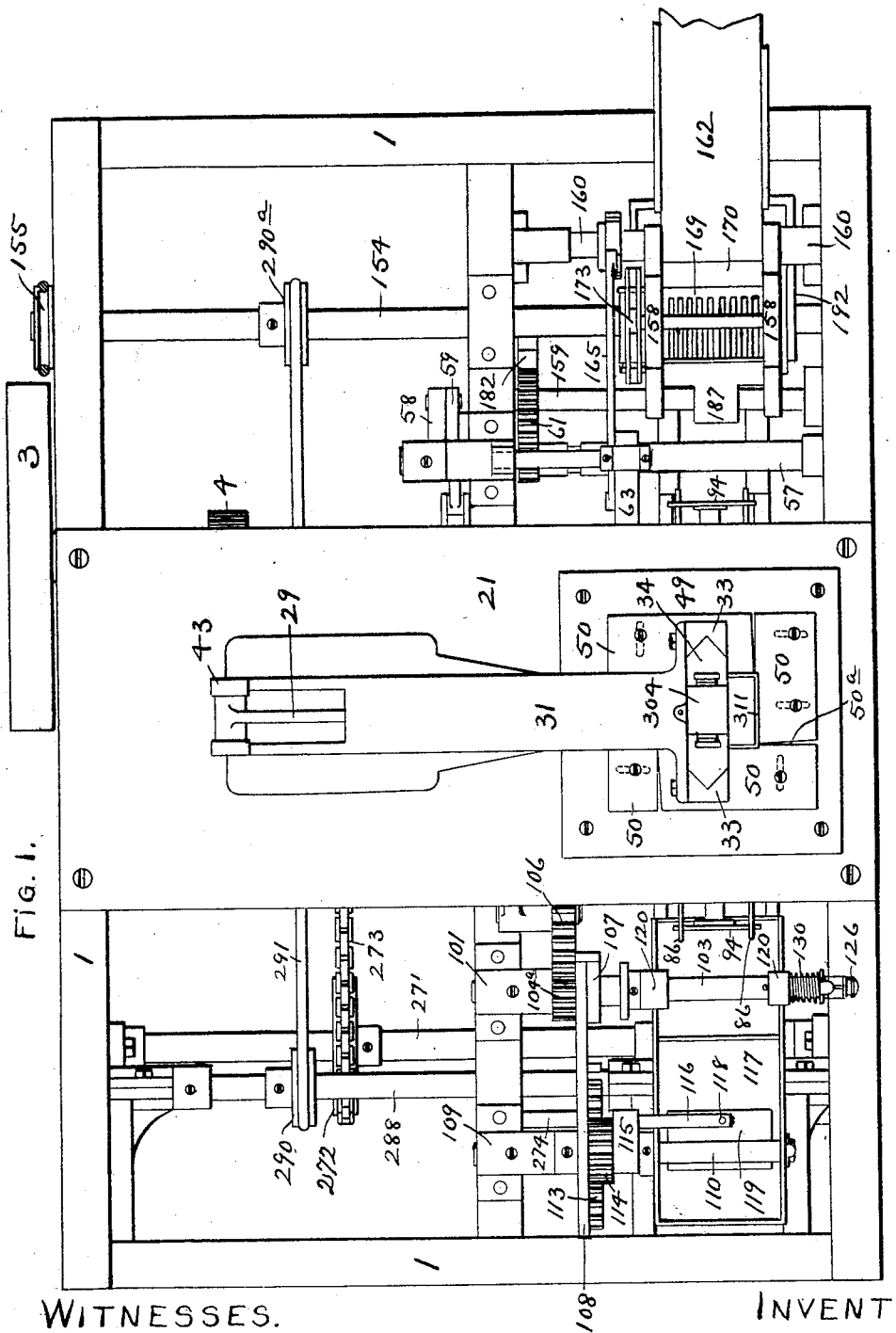

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 1.

WITNESSES.
C. J. Webster
W. R. Evans

INVENTOR.
ALFRED H. RANDALL, Jr.
BY William Webster
ATTORNEY.

No. 669,548. Patented Mar. 12, 1901.
A. H. RANDALL, JR.
MACHINE FOR MAKING ALL TOBACCO CIGARETTES.
(Application filed June 11, 1900.)
(No Model.) 13 Sheets—Sheet 2.

WITNESSES.
C. J. Webster
W. R. Evans

INVENTOR.
ALFRED H. RANDALL, JR.
BY William Webster
ATTORNEY.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 3.
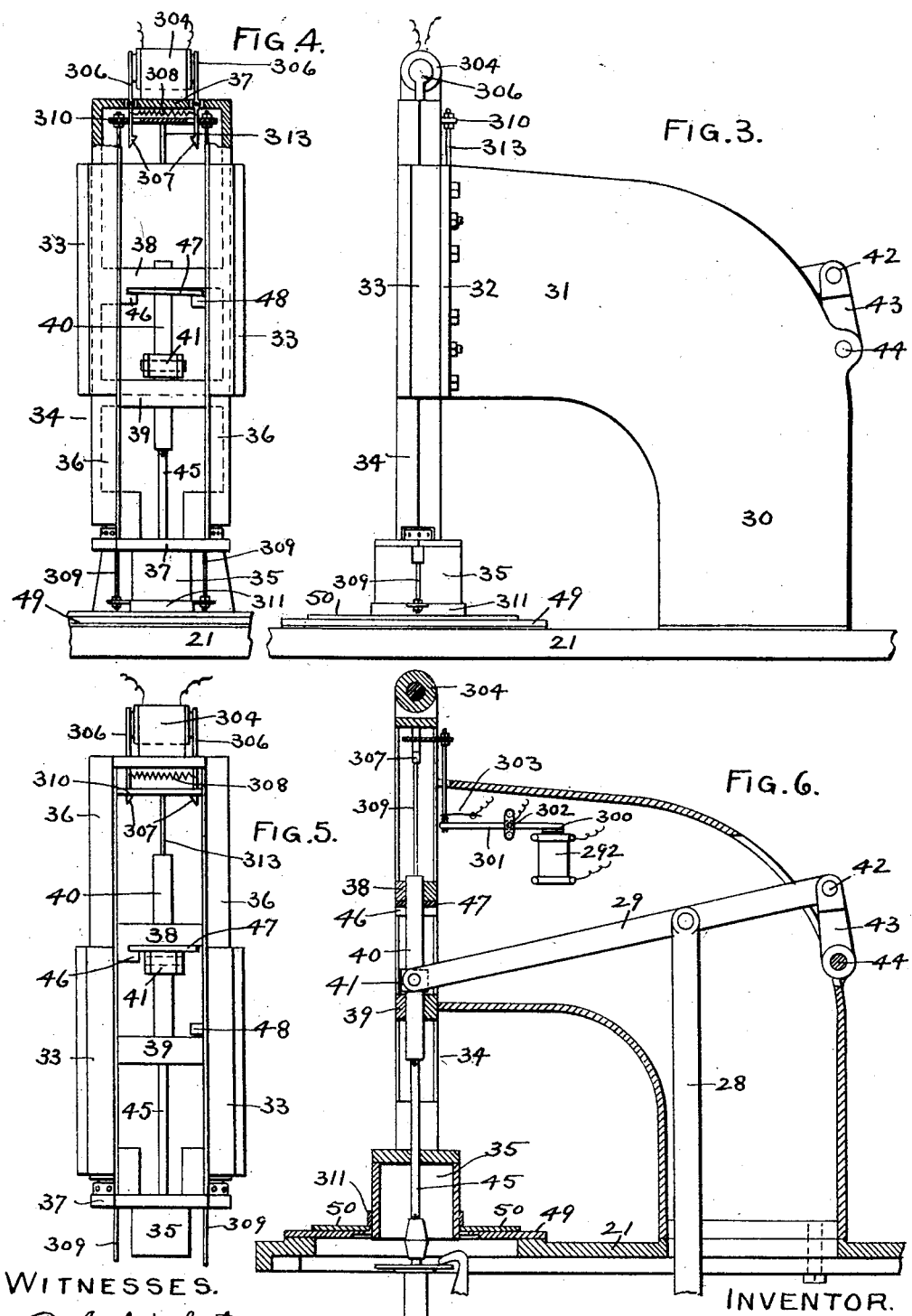
WITNESSES.
C. J. Webster
W. R. Evans
INVENTOR.
ALFRED H. RANDALL, Jr.
BY William Webster
ATTORNEY.

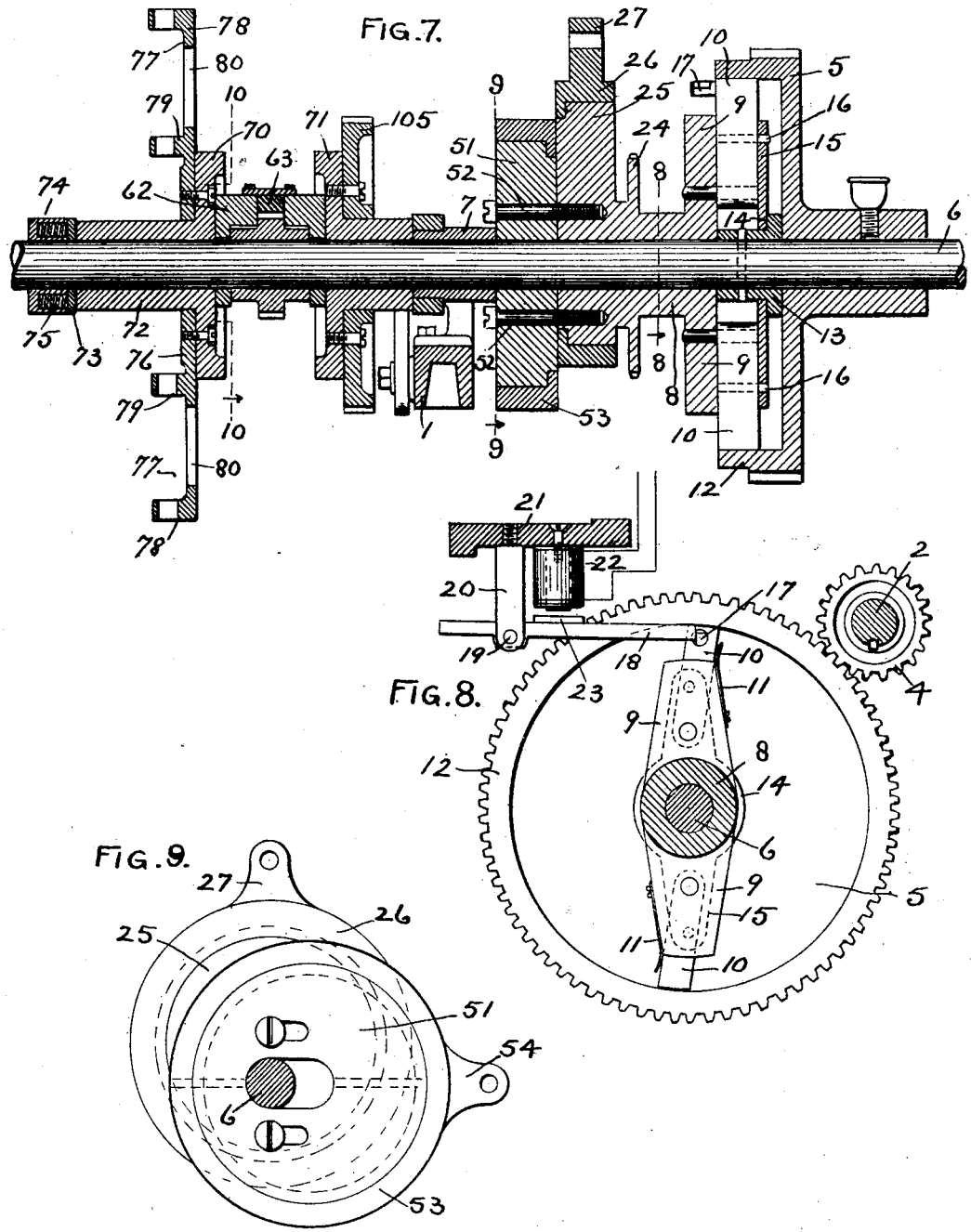

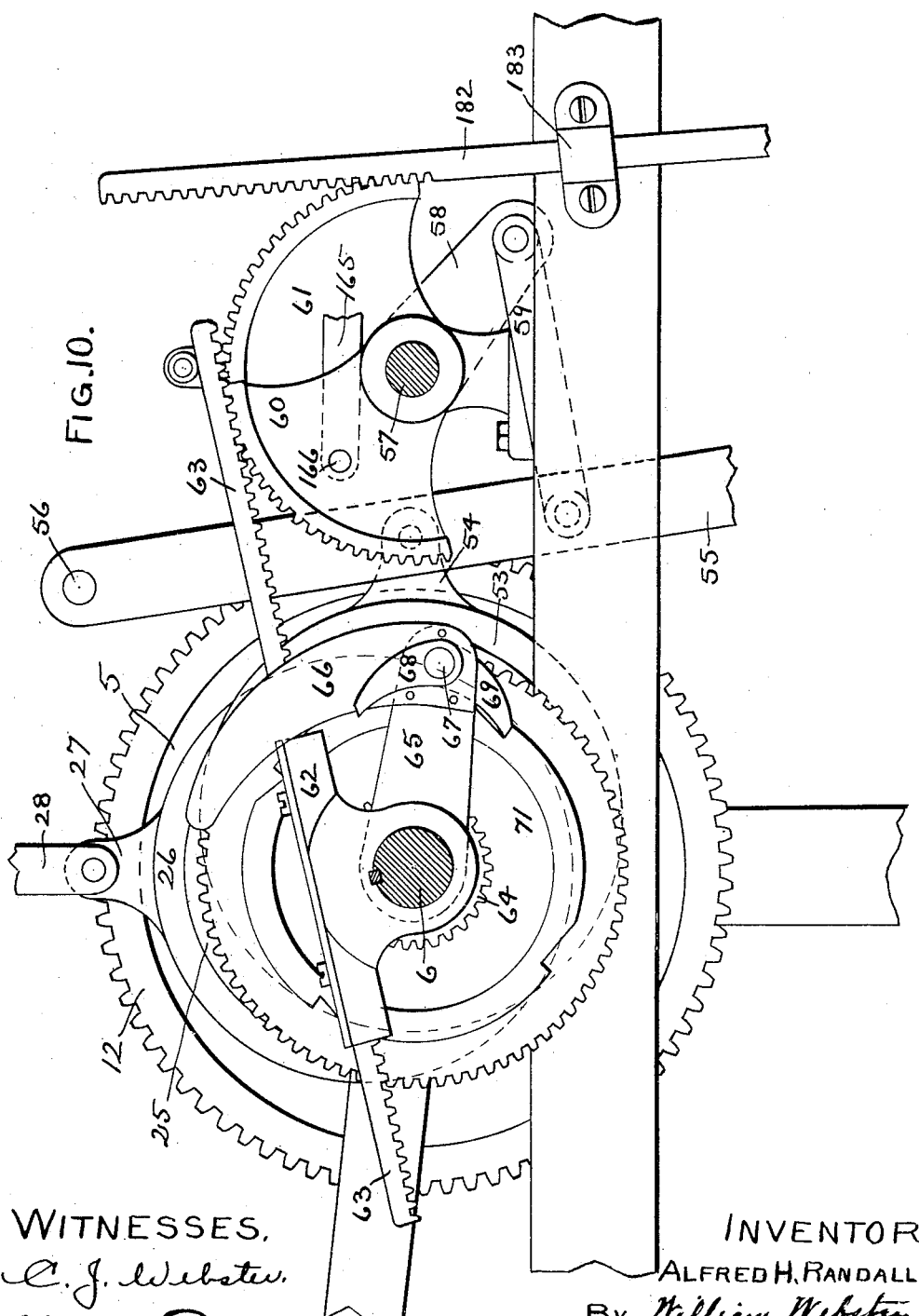

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 6.

WITNESSES.
C. J. Webster.
W. R. Evans

INVENTOR.
ALFRED H. RANDALL, JR.
BY William Webster
ATTORNEY.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 8.
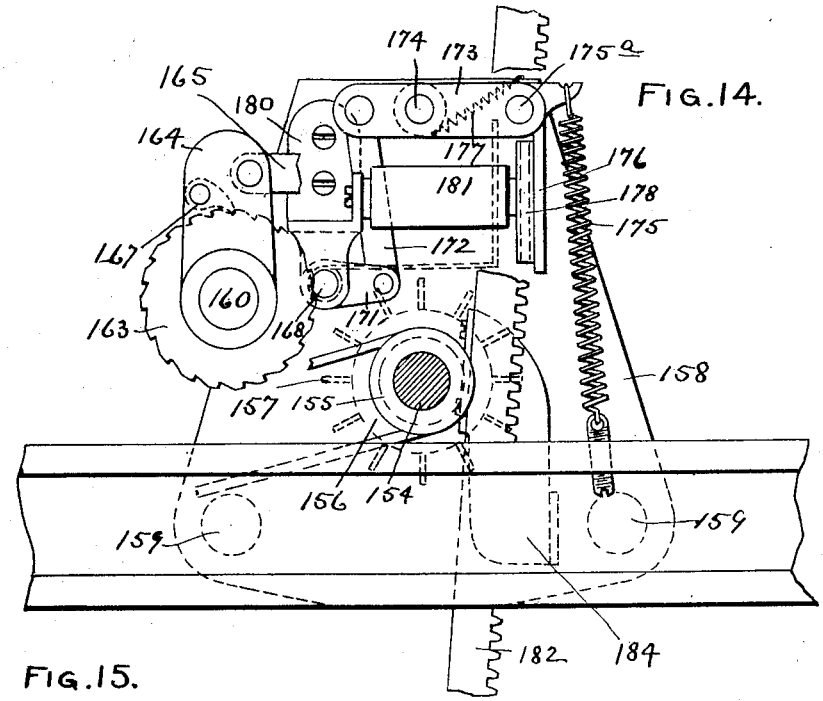
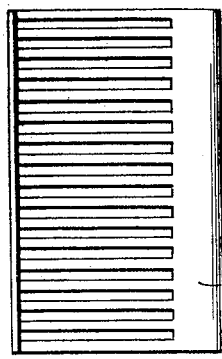
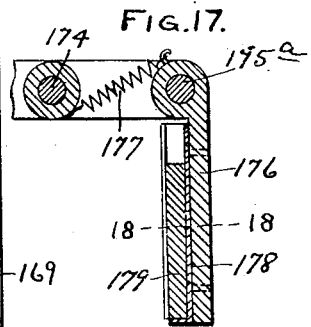
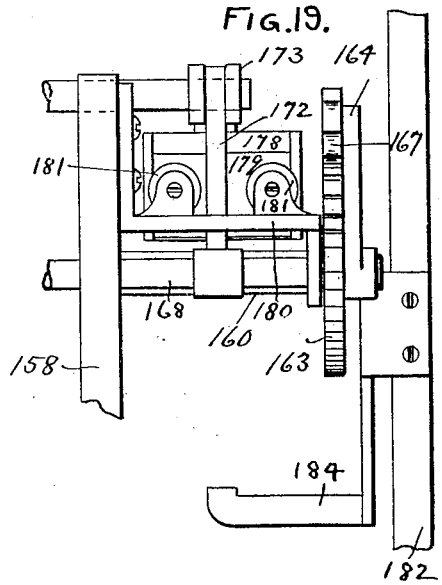
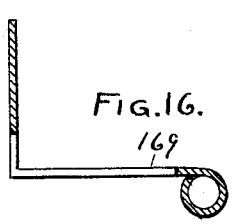
WITNESSES.
C. J. Webster.
W. R. Evans
INVENTOR.
ALFRED H. RANDALL, JR.
BY William Webster
ATTORNEY.

No. 669,548.   
A. H. RANDALL, Jr.   
Patented Mar. 12, 1901.
MACHINE FOR MAKING ALL TOBACCO CIGARETTES.
(Application filed June 11, 1900.)
(No Model.)   
13 Sheets—Sheet 9.
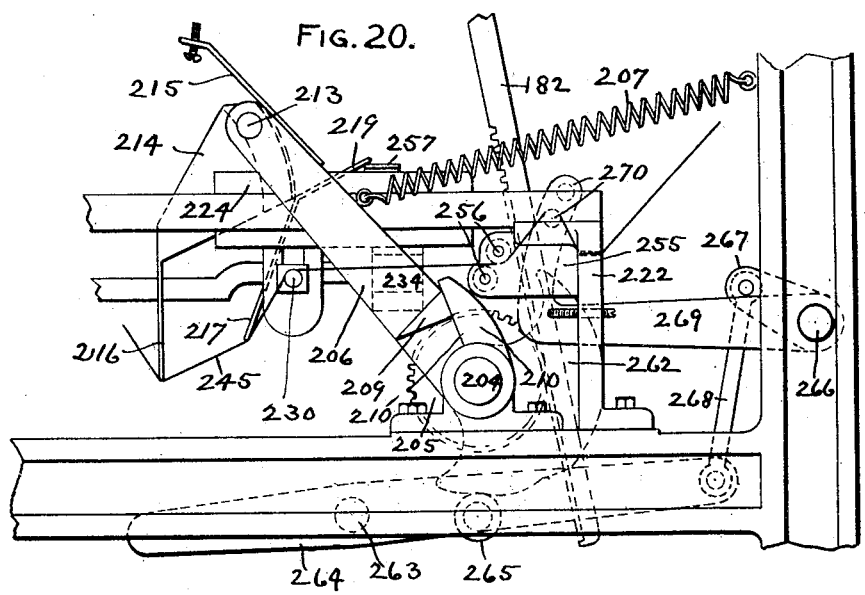
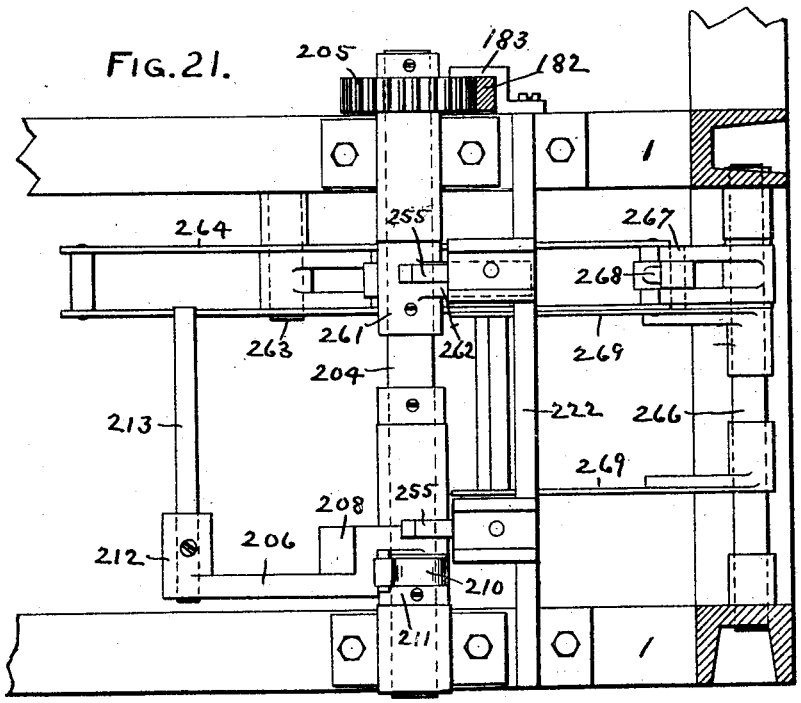
WITNESSES.   
C. J. Webster   
W. R. Evans
INVENTOR.   
ALFRED H. RANDALL, JR.   
BY William Webster   
ATTORNEY.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 10.

WITNESSES.
C. J. Webster.
W. R. Evans

INVENTOR.
ALFRED H. RANDALL, JR.
BY William Webster
ATTORNEY.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 11.

WITNESSES.
C. J. Webster
W. R. Evans

INVENTOR
ALFRED H. RANDALL, JR.
By William Webster
ATTORNEY.

THE NORRIS PETERS CO., PHOTO-LITHO., WASHINGTON, D. C.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 12.
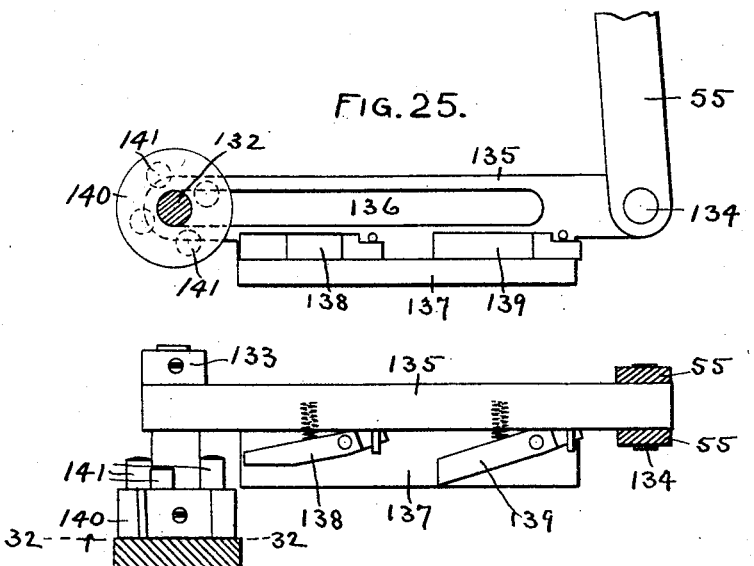
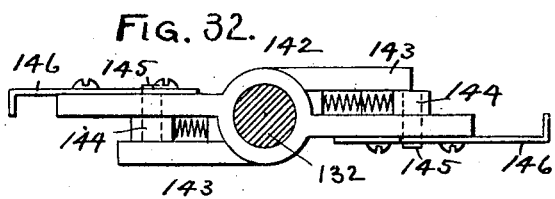
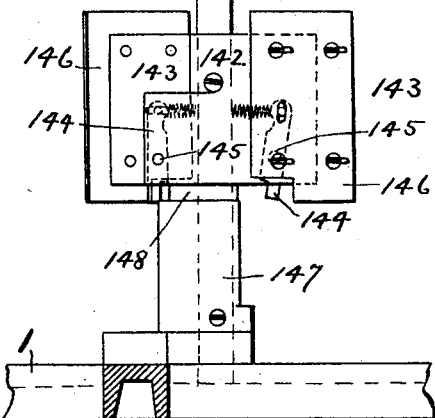
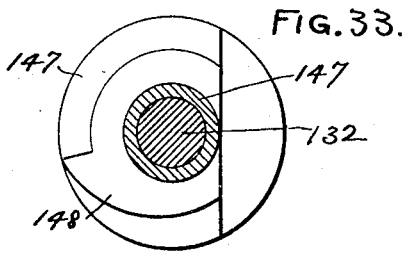
WITNESSES.
C. J. Webster
W. R. Evans
INVENTOR.
ALFRED H. RANDALL, JR.
BY William Webster
ATTORNEY.

No. 669,548. Patented Mar. 12, 1901.
A. H. RANDALL, Jr.
MACHINE FOR MAKING ALL TOBACCO CIGARETTES.
(Application filed June 11, 1900.)
(No Model.) 13 Sheets—Sheet 13.
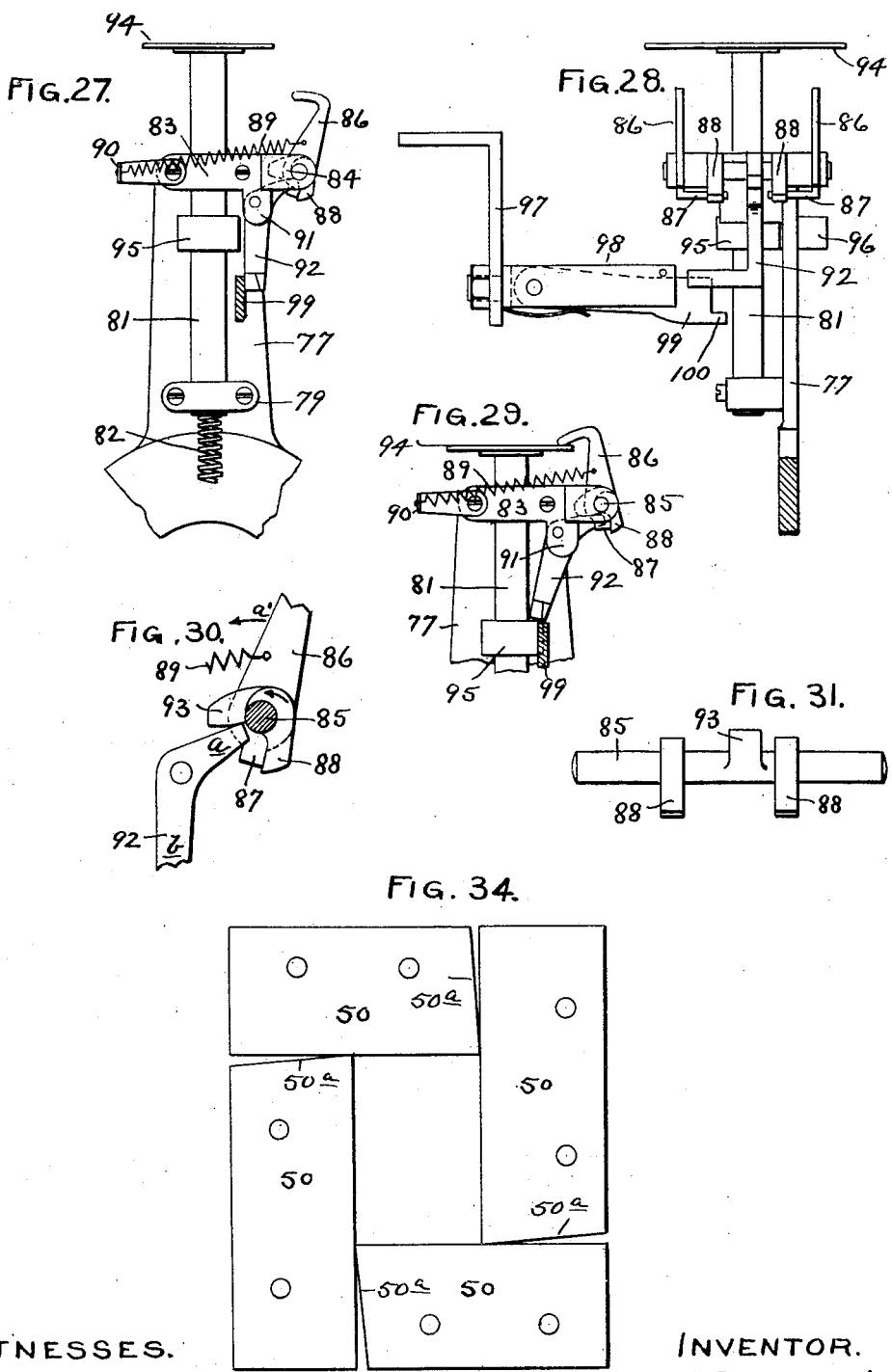
WITNESSES.
C. J. Webster
W. R. Evans
INVENTOR.
ALFRED H. RANDALL, Jr.
By William Webster
ATTORNEY.

UNITED STATES PATENT OFFICE.

ALFRED H. RANDALL, JR., OF PHILADELPHIA, PENNSYLVANIA, ASSIGNOR TO HIMSELF AND PEMBROKE D. HARTON, OF SAME PLACE.

MACHINE FOR MAKING ALL-TOBACCO CIGARETTES.

SPECIFICATION forming part of Letters Patent No. 669,548, dated March 12, 1901.

Application filed June 11, 1900. Serial No. 19,810. (No model.)

*To all whom it may concern:*

Be it known that I, ALFRED H. RANDALL, Jr., a citizen of the United States, residing at Philadelphia, in the county of Philadelphia and State of Pennsylvania, have invented certain new and useful Improvements in Machines for Making All-Tobacco Cigarettes, of which the following is a specification.

My invention relates to a machine for making all-tobacco cigarettes, and has for its object, primarily, to provide mechanism for cutting and feeding the wrapper to the rolling mechanism and separating and feeding the filler in a rolled condition to the wrapper, and inclosing the filler within the wrapper, and in trimming the ends of the cigarette, forming a complete cigarette, with both the filler and the wrapper composed of tobacco.

A secondary object is to provide automatic mechanism to produce this result which shall be properly timed in its several operations and which shall be under perfect control of the operator to start or stop the mechanism at will and in which the mechanisms performing the different operations are connected with each other, so that the act of completion of one operation shall serve as a means to actuate other mechanism.

The invention consists in the parts and combination of parts hereinafter described, and pointed out in the claims.

Figure 2:
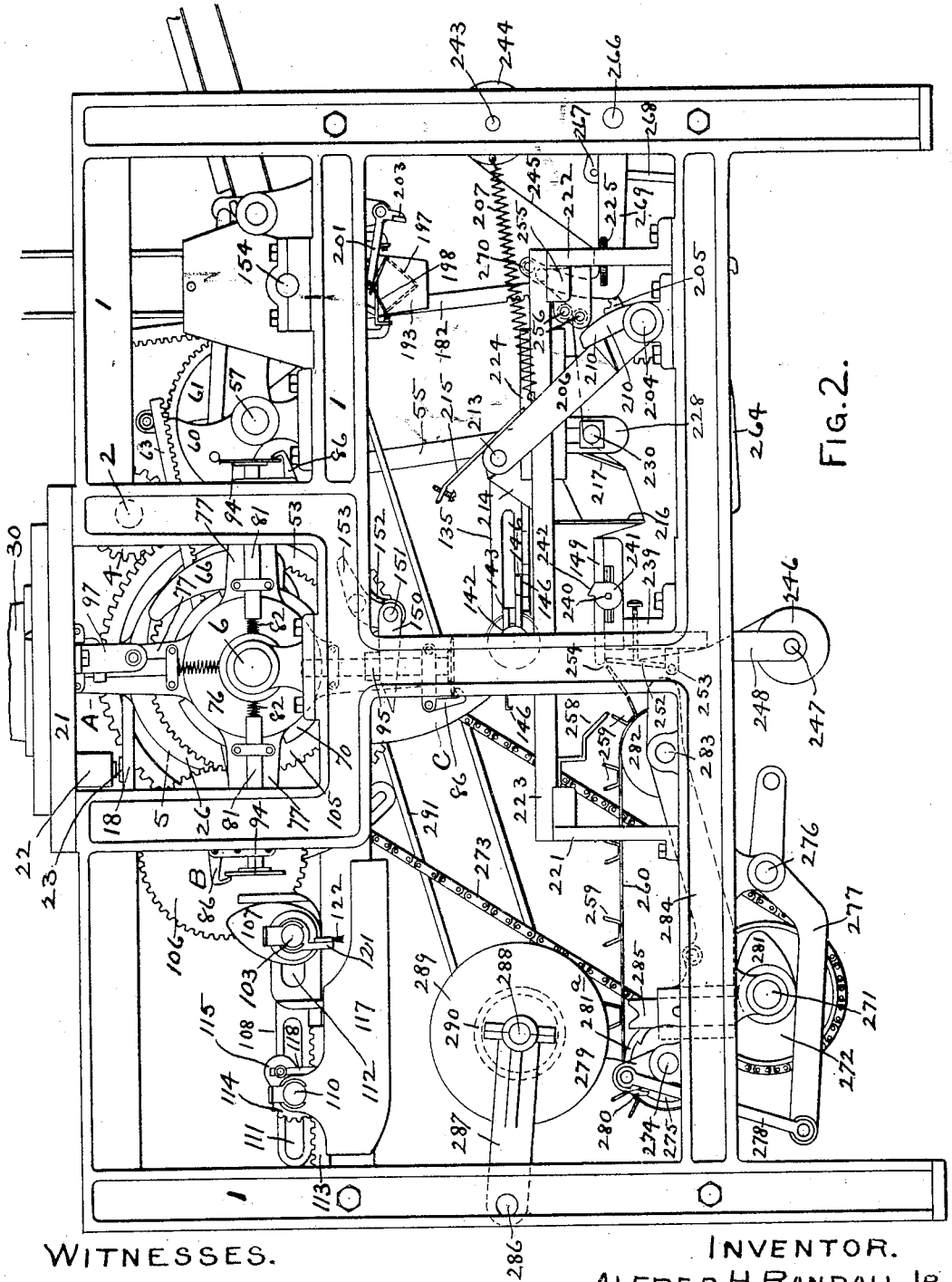
Figure 11:
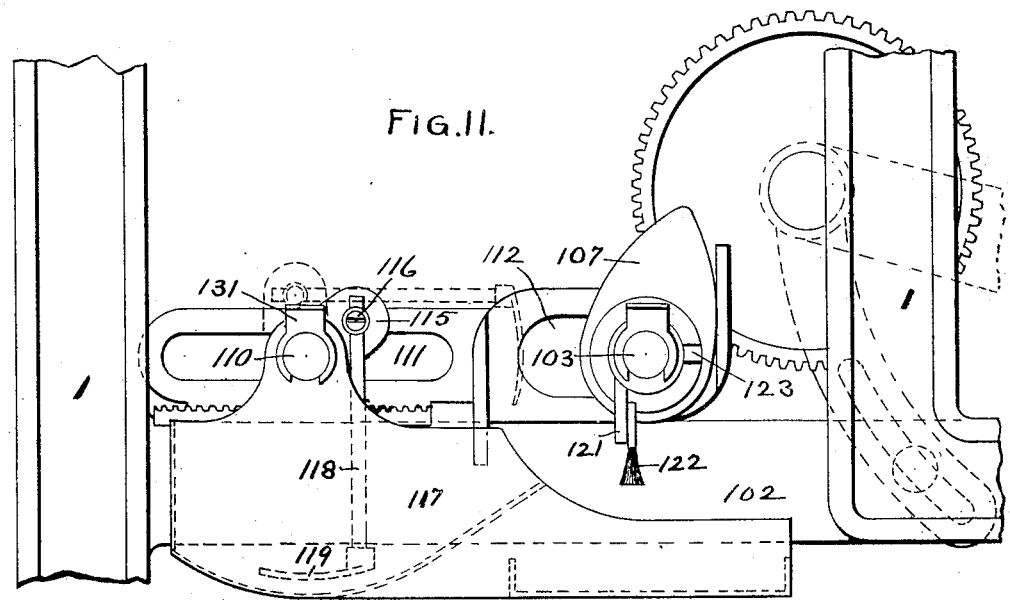
Figure 12:
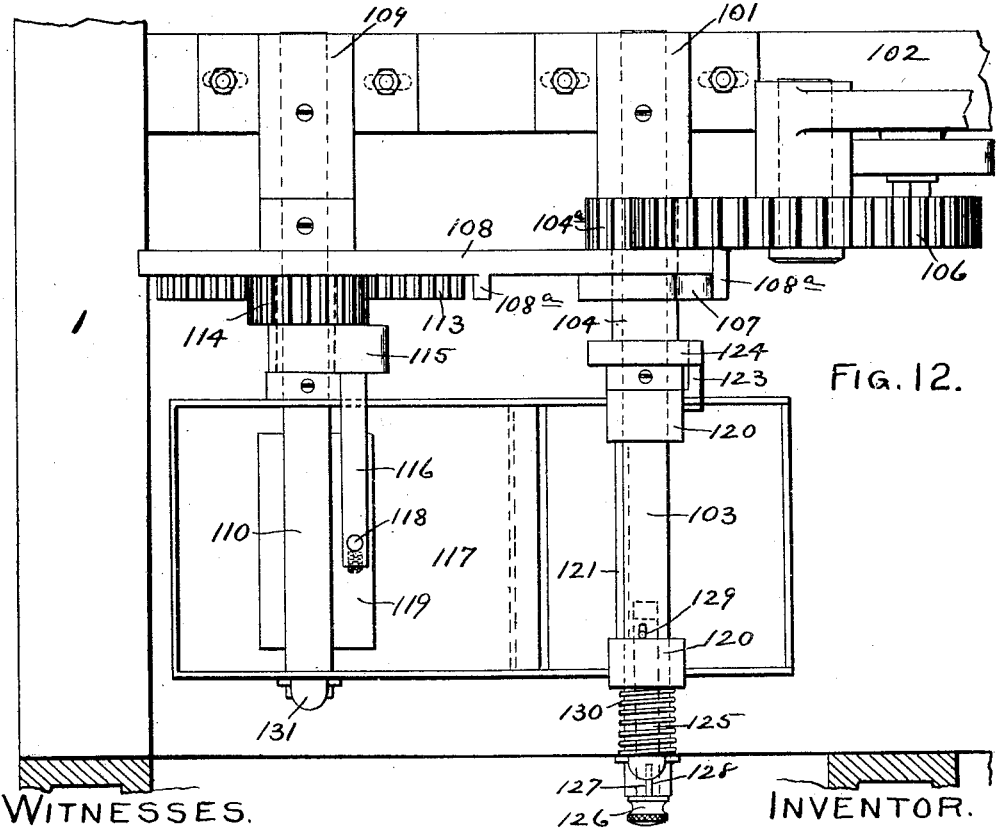
Figure 13:
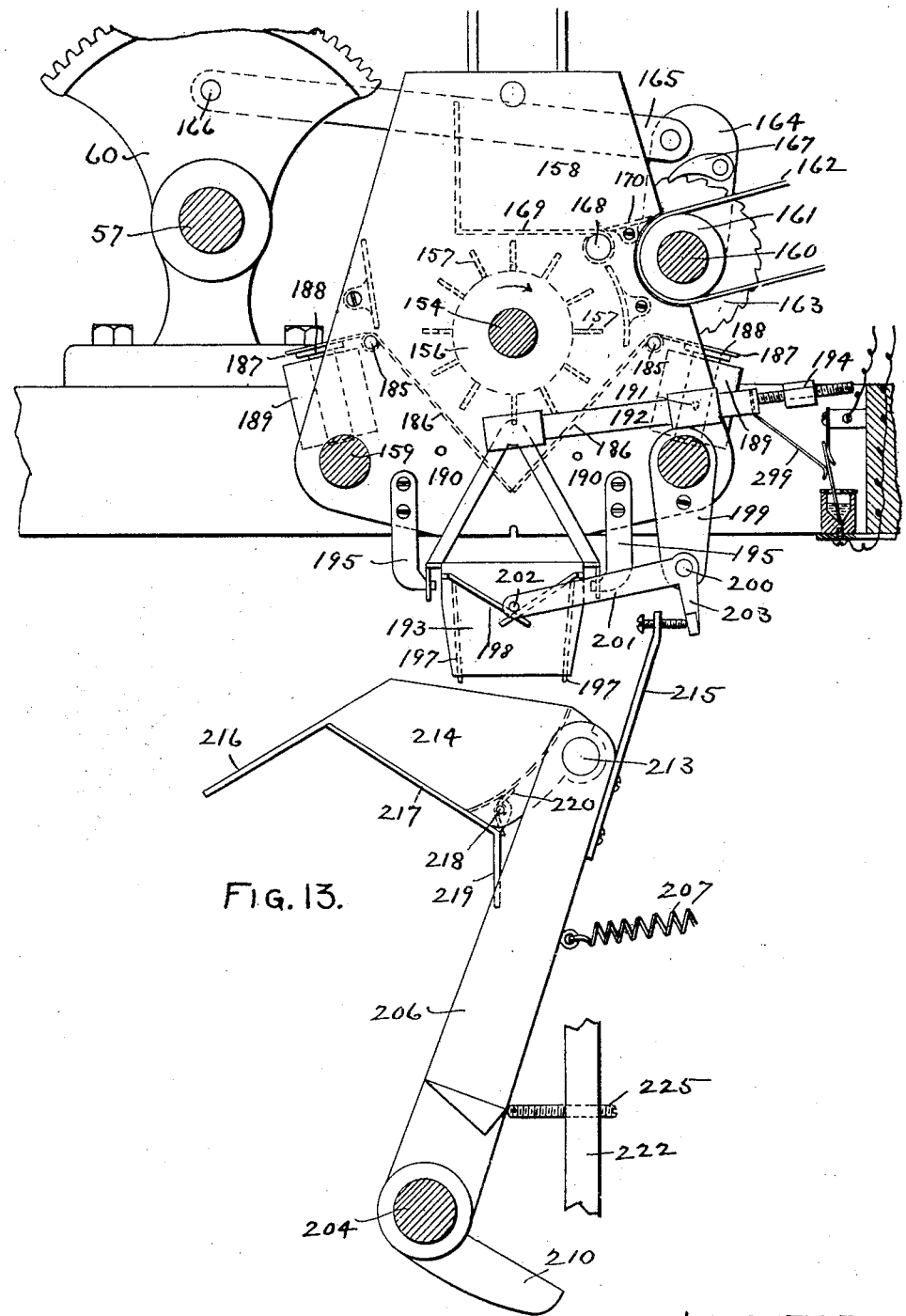
Figure 22:
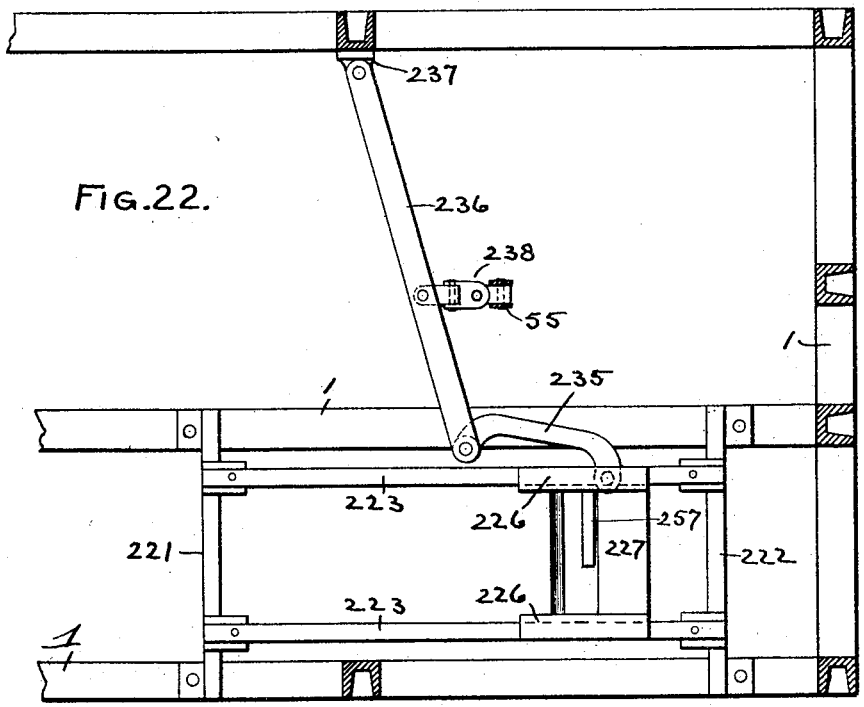
Figure 23:
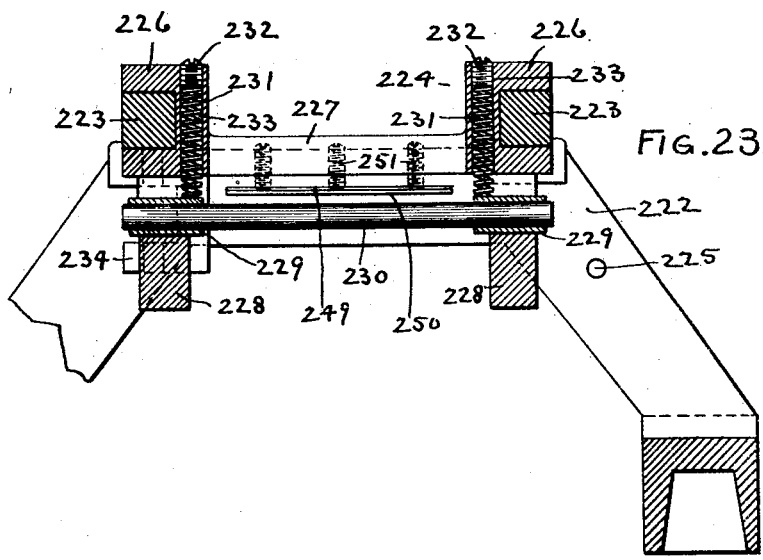
Figure 24:
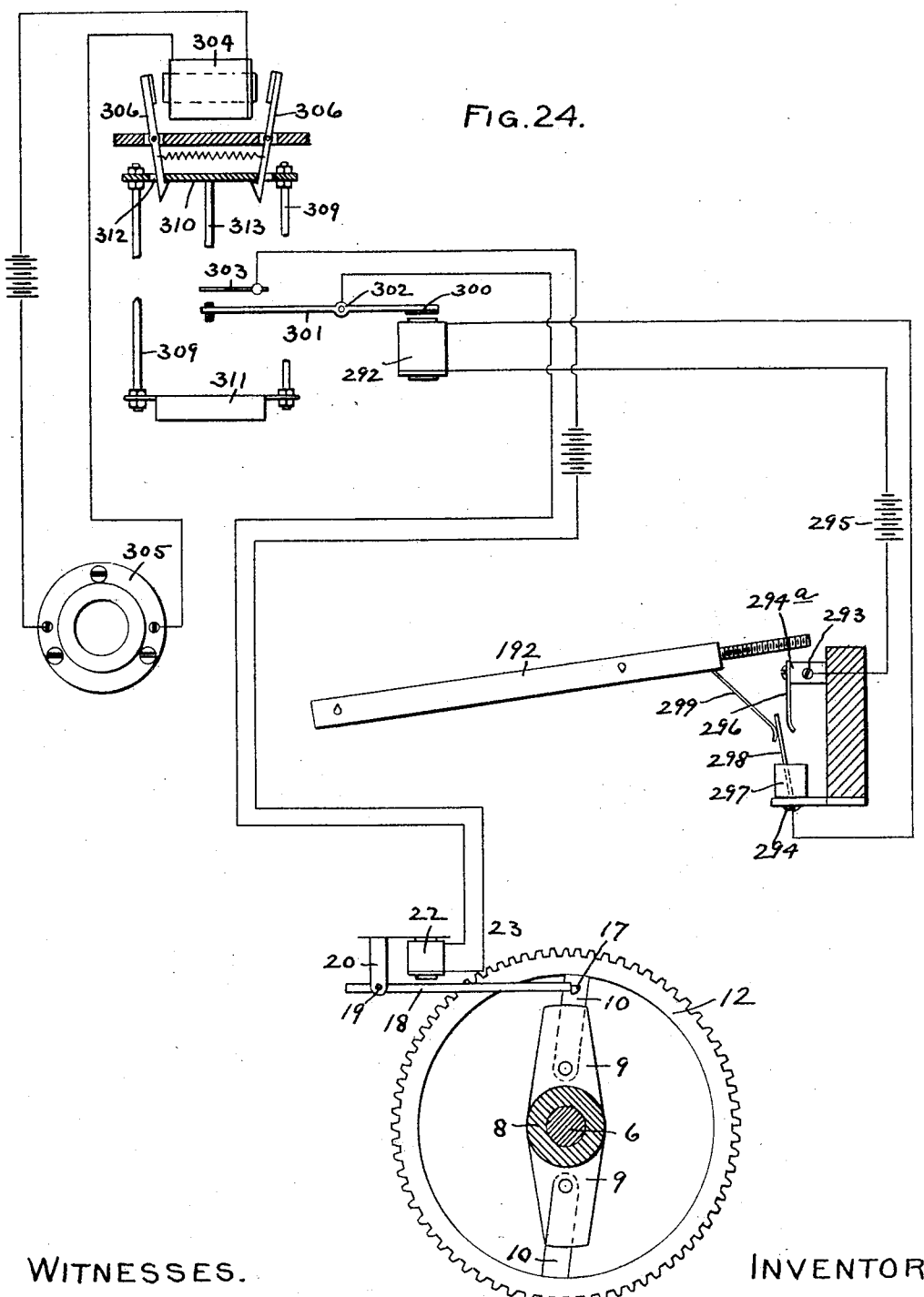

In the drawings, Figure 1 is a plan view of a complete machine for making all-tobacco cigarettes embodying the essential features of my invention. Fig. 2 is a side elevation of the same, the cutting mechanism being omitted. Fig. 3 is a side elevation of the cutting mechanism. Fig. 4 is a front elevation, the punch being at the lowest extremity of its movement. Fig. 5 is a like view of a portion of the same, the punch being raised. Fig. 6 is a transverse sectional elevation of the cutting mechanism. Fig. 7 is a sectional elevation of the mechanism upon the main shaft, the end bearings only being omitted. Fig. 8 is a sectional detail view of the driving-shaft and main shaft, showing the driving-gear in its relation with the clutch-gear, this view being taken at a point indicated by the lines 8 8, Fig. 7. Fig. 9 is a sectional elevation of the main shaft, taken at a point indicated by the lines 9 9, Fig. 7, showing the eccentrics, one to reciprocate the cutting-punch and the other to impart motion to the vertical swinging bar and its connections. Fig. 10 is a sectional elevation of the main shaft, taken at a point indicated by lines 10 10, Fig. 7, showing the main rock-shaft and the means for rocking the same. Fig. 11 is a side elevation of the pasting mechanism. Fig. 12 is a plan view of the same. Fig. 13 is a sectional elevation of the mechanism for feeding, separating, weighing, and transferring the filler to the rolling mechanism. Fig. 14 is a rear elevation of the separating-chamber. Fig. 15 is a plan view, and Fig. 16 is a transverse sectional view, of the slatted separator-table. Fig. 17 is a sectional detail view of the armature and its holder, which controls the position of the separator-table with reference to the separator proper. Fig. 18 is a sectional view on lines 18 18, Fig. 17. Fig. 19 is a side elevation of a portion of the separator mechanism. Fig. 20 is a front elevation of the mechanism for transferring the filler from the scale to the rolling-belt and of the slack-take-up for the belt. Fig. 21 is a plan view of the same. Fig. 22 is a sectional plan view of a portion of the machine, illustrating more particularly the cigarette-roller carriage and the means for reciprocating the same. Fig. 23 is a transverse sectional elevation of the roller-carriage. Fig. 24 is a diagrammatic illustration of the controlling mechanism for the machine. Fig. 25 is a front elevation of the transfer mechanism for the wrapper. Fig. 26 is a plan view of the same. Fig. 27 is a detail view, in front elevation, of one of the carrier-arms, the carrier-plate being extended. Fig. 28 is a side elevation of the same. Fig. 29 is a partial view similar to Fig. 27, the carrier-plate being in a retracted position. Fig. 30 is a sectional detail view of the controlling-shaft of the carrier-arms. Fig. 31 is a front elevation of the same. Fig. 32 is a sectional elevation taken at a point indicated by lines 32 32, Fig. 26. Fig. 33 is a detail sectional view of the cam for moving the transfer-plates, and Fig. 34 is a plan view of the die for cutting the wrapper.

Secured in suitable bearings on the frame 1 is the driving-shaft 2, upon which is secured the driving-pulley 3, receiving motion from the counter-shaft, and a pinion 4, which meshes with a clutch-gear 5, loosely journaled upon a main shaft 6, fixedly secured in bearings at each end, and, in a central bearing 7, the driving-shaft, and consequently the clutch-gear, have a continuous revolution. Loosely journaled upon the main shaft 6 contiguous to the clutch-gear 5 is a sleeve 8, having integral arms 9, projecting upon opposite sides at the rear end, said arms having pivotally secured thereto at their inner ends clutch-arms 10, the outer free ends of which are normally projected forward by means of leaf-springs 11, secured to the arms 9, the free ends bearing against the clutch-arms. Clutch-gear 5 is formed with an annular flange 12, forming a recess in which the clutch-arms are housed, the clutch-arms contacting with the inner face of the flange when projected.

Secured upon shaft 6 between the web of the clutch-gear and the sleeve 8 is a flanged collar 13, which properly spaces the clutch-gear and the sleeve, and upon said collar is loosely journaled a disk 14, having oppositely-projecting arms 15, and projecting through the outer end of said arms and orifices in the clutch-arms are pins 16, whereby when one of the clutch-arms 10 is moved the opposite clutch-arm is correspondingly moved. Projecting from the outer end of one of the clutch-arms is a pin 17, which in its path of travel normally abuts against the end of an arm 18, pivotally secured at 19 to a hanger 20, depending from a plate 21, secured upon frame 1.

As shown in Fig. 8, arm 18 is in its lowered position and in engagement with the pin 17, the said arm being raised by means of a magnet 22, also secured to plate 21 when said magnet is energized, there being an armature 23 upon arm 18 in alinement with the core of the magnet. When the arm is raised and pin 17 is released, springs 11 force the outer end of clutch-arms 10 into engagement with the clutch-face of the clutch-gear, and the revolution of the clutch-gear is imparted to the sleeve 8 until the magnet is demagnetized and the lever 18 allowed to drop into the path of travel of pin 17. Upon the sleeve 8 is a sprocket-wheel 24 and an eccentric 25, and upon said eccentric is a strap 26, having a perforated lug 27 projecting therefrom, to which is secured one end of a link 28, Fig. 10, the opposite end of said link being pivotally secured to an arm 29, which operates the punch, which I will now describe.

Secured to cross-plate 21 at its rear side is a hollow standard 30, which projects forward at its upper end, as at 31, and is provided with side wings 32, to which are secured two guides 33. Sliding vertically in the guides 33 is a plunger 34, which carries on its lower end punch 35. Plunger 34 is preferably formed with elongated sides 36, joined at the top and bottom by webs 37, respectively, and at points intermediate their length by cross-pieces 38 and 39. Cross-pieces 38 and 39 are provided with alined orifices substantially centrally thereof, in which a rod 40 is guided, and secured upon the rod between cross-pieces 38 and 39 is a sleeve 41, to which the forward end of the lever 29, heretofore described, is pivotally secured, the opposite end of lever 29 being pivotally secured at 42 to the free end of a link 43, which is pivotally secured upon a pin 44, secured in lugs upon standard 30. Consequently as the eccentric 25 is revolved its plunger 34 is reciprocated.

In order to release the wrapper after it has been cut and to force the same upon the carrier, I have provided a supplemental plunger 45, which must of necessity make its stroke after the plunger 34 has completed its stroke. To produce this result through the medium of one lever 29, I have secured to the cross-pieces 38 a depending lug 46, forming a recess into which one end of a plate 47 is confined, the plate having a central orifice slightly larger in diameter than the diameter of rod 40, the opposite end of the plate projecting beyond the rod 40 and in alinement with a lug 48, carried by the portion 31 of standard 30. Consequently when the plunger is raised the parts are in the position shown in Fig. 5, and as the rod 40 is lowered it carries with it the plunger 34 by reason of the impingement of the plate upon the rod until the free end of the plate contacts with the lug 48, when the plate is raised into a parallel relation with the cross-piece 48, when the plunger 34 will remain stationary and the rod 40, carrying the supplemental plunger 45, will complete its stroke and carry the cut wrapper and deposit the same upon the carrier.

Secured upon the cross-piece 21 is a plate 49, having an orifice substantially larger than the cross-sectional area of the punch, and secured upon said plate are the knives 50, which form the die. I have provided for adjustability of the knives in all directions to provide for the finest adjustment and to compensate for wear, and therefore arrange the knives as shown in Fig. 34, each knife having one end at right angles to its cutting-face, the opposite end 50$^a$ being at an acute angle thereto, whereby the point in abutting against the cutting-face of the adjacent knife forms a sharp corner, and the contact-surface of one knife with another is reduced to a minimum and is only at the cutting-point.

Arranged upon shaft 6, Figs. 7 and 10, is an eccentric 51, which is secured to the eccentric 25 by means of screw-bolts 52, and secured upon eccentric 51 is a strap 53, carrying a lug 54, which is pivotally secured to a vertical bar 55, by which means a swinging motion is imparted to the bar, said bar being pivotally secured at its upper end at 56 to a hanger secured upon the under side of plate 21. In order to distinguish this bar 55 from other parts of the mechanism, I will designate it the "vertical swinging bar."

Journaled in suitable bearings upon the frame is a rock-shaft 57, and secured upon the rock-shaft is an arm 58, which is connected with the vertical swinging bar 55 by means of a link 59, and secured upon the rock-shaft are two segmental gears 60 and 61. Secured upon the shaft 6 is a hanger 62, which is keyed to the shaft, and in which is slidingly secured a rack-bar 63, said rack-bar meshing at one end with the segmental gear 60 and at its opposite end with a gear-wheel 64, loosely journaled upon the main shaft 6. Consequently as the clutch-gear is revolved a rock motion is imparted to the rock-shaft 57, a reciprocatory movement is imparted to the rack-bar 63, and a rocking movement is imparted to the gear-wheel 64. Carried by the gear-wheel 64 is an arm 65, to the outer end of which is secured a curved plate 66, and in which is secured a stub-shaft 67, carrying upon each end an oppositely-disposed pawl 68 and 69, respectively.

Secured upon shaft 6, upon each side of hanger 62, is a ratchet-wheel 70 and 71, with which the pawls 68 and 69 respectively contact. Consequently as the gear-wheel 64 is rocked it carries with it the arm 65 and moves ratchet-wheel 70 in one of its movements and the wheel 71 upon its return movement. Ratchet-wheel 70 has a long bearing 72, against which a disk 73 abuts, and secured upon the shaft 6, adjacent to disk 73, is a collar 74, which carries a plurality of coiled springs 75, which bear against bearing 72, the object being to secure a frictional engagement of the parts, so that they will remain in a stationary position when out of engagement with the moving parts of the mechanism.

Secured to the front face of the ratchet-wheel 70 is the carrier 76, comprising four arms 77, each of which is formed with a lug 78 at the outer extremity of the arm and a lug 79 at a point substantially midway, there being radial slots 80 in each arm located between the lugs. Slidingly secured in orifices in the lugs is a bar 81, which is normally held in a projected position by means of springs 82, interposed between the end of the bar and a bearing 72, heretofore described. Secured upon each side of the lug 78 is a plate 83, one end projecting beyond the arm 77, and forming a bearing for a stub-shaft 85, and upon which at each end is secured a catch 86, and projecting inwardly from the lower end of the catch is a projection 88, carried by the stub-shaft 85, coiled springs 89, interposed between the catches 86 and lugs 90, carried by plate 83, serving to at all times hold the projection 87 against the projection 88 upon the stub-shaft. Depending from each plate 83 is a lug 91, between which is pivotally secured a dog 92, the upper projecting end resting beneath a lug 93, carried by the stub-shaft, the lower end normally abutting against the bar 81.

The operation and construction of the parts just described can be more readily understood by referring to Fig. 30, in which it will be seen that the spring 89 exerts a pull upon the catch 86 to move the same in the direction indicated by the arrow and that the projection 87 upon the lower end of the catch normally exerts a pressure to revolve the shaft in the direction indicated by the arrow. Consequently the lug 93, carried by the shaft, will force the end $a$ of the dog downwardly and the lower end $b$ toward the bar 81, as has been described. Therefore while the end $b$ of the dog 92 is held from the bar, as shown in Fig. 27, the end $a$ of the dog holds the catches 86 back; but when the end $b$ of the dog 92 is released to move into the position shown in Fig. 29 the stub-shaft will revolve and the catches move forward.

Secured upon the upper end of bar 81 is a plate 94, which when in the position shown at A, Fig. 2, is ready to receive the wrapper as it is punched, the supplemental plunger 45 forcing the bar down until it is engaged by the catches 86. Secured upon bar 81 is a collar 95, which has a forwardly-extending projection 96, which passes through the slot 80 in the carrier-arms and projects beyond the rear of the carrier-arms. When the supplemental plunger has forced the bar 81 down, collar 95 has moved to a point below the lower end of the part $b$ of the dog 92, releasing the dog and allowing it to move in the position shown in Fig. 29. The collar will then abut against the end of the dog, and the bar 81 will be held down against the tension of the spring until the dog is moved from engagement with the collar, when the catches are thrown back and the bar is free to move outwardly. Consequently as the supplemental plunger forces the bar 81 down collar 95 has moved to a point below the lower end of the part $b$ of the dog 92, releasing the dog and allowing it to move in the position shown in Fig. 29. The collar will then abut against the end of the dog and the bar 81 will be held down against the tension of the spring until the dog is moved from engagement with the collar, when the catches are thrown back and the bar is free to move outwardly. Consequently as the supplemental plunger forces the bar 81 down the collar releases the dog, allowing the catches to fly down and engage the end of the wrapper which is deposited upon the plate 94, and will engage with the end of the dog when it is released by the supplemental plunger. At this stage of the operation pawl 68 revolves ratchet-wheel 70 a one-fourth turn, and the carrier-arm is also moved from its position shown at A, where it has received the cut wrapper, to the position shown at B, Fig. 2, at which point is located the pasting mechanism, a further one-fourth turn carrying the arm to the position shown at C, where the wrapper is released and transferred to the rolling mechanism, the arm having no further function and the plate and bar remaining in its retracted position until it again resumes the position at A to receive another wrapper, and when the bar is released automatically and the parts resume their position as shown in Fig. 27. To accomplish this result, to the lower side of plate 21 is secured a hanger 97, Figs. 2 and 28, and projecting forwardly from the hanger is a plate 98, to which is pivotally secured a dog 99, which is in the path of travel of the angled end of the dog 92. Consequently the dog is removed from contact with the collar 95 and the bar 81 is allowed to move upwardly. As the bar is forced down, however, by the supplemental plunger the collar 95 contacts with the projection 100 upon the dog 99 and releases the same from the dog 92, allowing the same to spring against the bar 81 and also the catches 86 to engage the wrapper upon plate 94, as has been described. Secured in a bearing 101 upon a longitudinal cross-beam 102 is a shaft 103, and upon said shaft is secured a sleeve 104, upon which is secured a pinion $104^a$. Secured to the ratchet-wheel 71 is a gear-wheel 105, by which motion is imparted to pinion $104^a$ through the medium of idler-wheel 106. Consequently as the arm 65 and pawl 69 are moved and at the time when the carrier-wheel is stationary ratchet-wheel 71 is revolved a one-fourth turn, which through the medium of the idler-wheel imparts a full revolution to the pinion $104^a$.

Arranged upon sleeve 104 adjacent to the pinion and receiving motion therefrom is a cam 107, which in its revolution imparts a reciprocatory movement to a plate 108. Secured in a bearing 109 is a shaft 110, said shaft and shaft 103 projecting through slots 111 and 112, respectively, in plate 108, which serve as a guide for the plate in its reciprocatory movements. Plate 108 carries a rack-bar 113, which is in engagement with a pinion 114, loosely journaled upon shaft 110, and secured upon a bearing of the pinion is an arm 115, which carries a rod 116. The reciprocatory movement of plate 108, imparted thereto by cam 107, imparts a partial revolution to the pinion 114, and consequently causes the arm 116 to move in the arc of a circle around shaft 110. Secured upon shaft 110 and depending therefrom is a paste-receptacle 117, the said rod 116 extending slightly beyond the center of the paste-receptacle, at which point it has secured thereto a depending rod 118, which carries upon its lower end a paste-plate 119. Consequently as the rod 116 is moved the paste-plate is also moved and will assume a horizontal position in front of shaft 103, as shown in dotted lines, Fig. 11.

Secured upon the shaft 103 are collars 120, which are connected by a plate 121, said plate carrying a paste-brush 122. One of the collars is provided with a projection 123, which engages with a collar $124^a$ upon sleeve 104, whereby as the pinion $104^a$ revolves a like motion is imparted to the collars 120, and consequently to the brush 122. As the brush revolves it contacts with the paste-plate and secures a supply of paste, and also contacts with the lower edge of the wrapper, which is in its path of travel, depositing the paste thereon.

The free end of shaft 103 is tubular for a portion of its length, and in said tubular portion is a rod 125, having a hand-knob 126, and secured to the knob is a pin 127, which rests in a groove 128 in the periphery of said shaft, and secured to the inner end of rod 125 is a pin 129, which bears against the inner face of the forward collar 120. Should it be desired to dispense with the use of paste, hand-knob 126 is pulled out and revolved, allowing the end of pin 127 to abut against the end of shaft 103, the pin 129 forcing the collar 120 against the tension of spring 130 and disengaging the projection 123 from the collar 124, when the collar 120 and the paste-brush will remain stationary.

To remove the paste-receptacle, I have provided a clip 131 to engage in a groove in shaft 110, which when removed allows the paste-receptacle to be removed to be cleaned or replenished with paste. Journaled in bearings carried upon the frame and located at a point contiguous to the carrier-arm when it has reached a point indicated at C, Fig. 2, is a shaft 132, and upon the inner end of said shaft is a collar 133, a revolution being imparted to the shaft by means of the vertical swinging bar 55, as will be described. This shaft carrying the transfer mechanism transfers the wrapper from the carrier onto the rolling-table.

Secured at one end at 134 to the vertical swinging bar 55 is a bar 135, which is provided with a slot 136, through which the shaft 132 passes and by which it is guided in its reciprocatory movement. Bar 135 is L-shaped in cross-section and upon the lower flange 137 are secured two pawls 138 and 139, the pawl 139 extending to the edge of the flange 137 and pawl 138 having less movement. Secured upon shaft 132 is a collar 140, and projecting rearwardly from said collar are four pins 141, equally spaced around said shaft, each alternate pin being of greater length—that is, two of said pins upon diametrically opposite sides of the shaft are of a length to contact with pawl 138, the remaining two being shorter and only in the path of travel of pawl 139. Consequently as the bar 135 is reciprocated it revolves shaft 132 one half-turn, the pawls swinging back from contact with the pins upon a return movement of the bar.

Secured upon shaft 132 is the transfer mechanism proper, which comprises an elongated collar 142, having two flanges 143 upon opposite sides. Between these flanges are secured levers 144, pivoted centrally at 145. The inner ends of said levers are spring-pressed to normally extend outwardly, and connected with the inner end of said levers to move therewith are transfer-plates 146. Secured upon shaft 132 is a sleeve 147, the inner end of which is formed with a cam-face 148, which as the transfer mechanism revolves, the outer end of the lever 144 bearing against the cam-face, will alternately extend and retract the transfer-plate. The transfer-plate revolves beneath the carrier-plate when it is in the position at C, Fig. 2. The edge of the transfer-plates contacting with the wrapper, and especially with the mucilaginous edge thereof, will cause the wrapper to adhere thereto and to be carried thereby, the wrapper being released by the catches 86 at this point of the operation. The transfer-plates are retracted while engaging the wrapper and are extended to lower the same and in lowering and depositing the same upon the rolling-table 149.

To release the wrapper from the carrier-arm, I have provided a pawl 150, pivotally secured upon a pin 151, secured in a bearing 152, depending from the frame, said pawl being in position to project beneath collar 95 upon bar 81 of the carrier-arm, and projecting upwardly and at one side of pin 151 is an arm 153, which is in the path of travel of plate 66, carried by the arm 65, which is carried by gear 64, journaled upon shaft 6. Consequently as the arm 65 reaches one extremity of its movement it forces down arm 153, raises pawl 150, and by its engagement with the collar 95 retracts the bar 81, separating the plate 94 from contact with the catches 86 and releases the wrapper, this operation being coincident with the engagement of the wrapper by the transfer-plate.

Journaled in suitable bearings upon the frame is a shaft 154, which passes through what I will designate the "separator," and has secured upon its opposite end a pulley 155, receiving motion from the counter-shaft, by which means a continuous revolution is imparted to the shaft. Secured upon the shaft, within the separator, is a cylinder 156, provided with a plurality of separator-teeth 157. The separator comprises side walls 158, which are connected by the shaft 154 and by shafts 159, and journaled in bearings secured to the walls is a shaft 160, which has secured thereon an elongated pulley 161, over which runs the carrier-belt 162, upon which the filler is placed and by which it is fed to the separator. Secured upon the rear end of shaft 160 is a ratchet-wheel 163, and loosely secured thereon adjacent to the ratchet-wheel is an arm 164, to which is pivotally secured one end of a rod 165, the opposite end of the rod being pivotally secured to the segmental gear 60 at 166. Consequently as rock-shaft 57 is rocked motion is imparted to arm 164, and by means of a pawl 167, carried by the arm and engaging with the ratchet-wheel 163, a revolution is imparted to the ratchet-wheel and also to the belt.

Journaled in the sides of the separator is a shaft 168, upon which is secured a slotted table 169, the slots therein being in alinement with the teeth upon the cylinder when lowered to allow the teeth to pass through the slots and when raised to be out of contact with the teeth. Extending across the interior of the separator and bridging over the space between the belt and table 169 is a supplemental table 170, the object of which is to feed the filler from the belt onto the slotted table. In order to regulate the supply of the filler to the cylinder, I have provided automatic means for raising the slotted table above the cylinder, thereby cutting off the feed of the filler to the cylinder, as I have found that the layer of the filler upon the carrier-belt when impeded will remain stationary and that the belt will slide beneath the filler.

In order to automatically move the slotted table, the table is fixedly secured upon shaft 168, and one end of the shaft extends beyond the side wall and has secured thereto a lever 171, which is connected by a link 172 to one end of a lever 173, pivoted at 174 to the side wall, the opposite end of the lever being normally depressed by means of a coiled spring 175, interposed between the same and the frame 1. The spring normally exerts a pressure to hold the slotted table in raised position, as shown more especially in Fig. 14. To the outer free end of the lever 173 is a pin $175^a$, upon which is pivotally secured a depending catch 176, which is normally held in an inclined position by means of a spring 177, Fig. 17. To this catch is secured a plate 178, in which is movably secured an armature 179. Secured to the side wall is a bracket 180, which carries electromagnets 181, which are in alinement with armature 179, carried by catch 176, and which when energized moves the catch from an inclined position to a vertical position.

In engagement with segmental gear 61 upon rock-shaft 57 is a rack-bar 182, which has a reciprocatory movement and is guided by straps 183, secured to the frame, near each end thereof, Figs. 10 and 21, whereby when the clutch-gear is revolved motion is imparted to the rack-bar. Secured upon the rack-bar is a catch 184, Fig. 14, this view illustrating the rack-bar and catch when in lowered position. When the rack-bar reaches a point near the upper extremity of its movement, the catch 184 in its path of travel will contact with catch 176 and raise the same—that is, if the magnet 181 is demagnetized—and consequently lower the slotted table into coaction with the separator. If the magnet 181, however, is energized, the catch 176 will be attracted thereto and be out of the path of travel of the catch 184.

Extending across the separator and secured in the side walls are shafts 185, upon which are hung doors 186, which have at their upper ends projecting flanges 187, having armature 188 secured thereto, and secured upon the shafts 159 are electromagnets 189, which when the armatures 188 are attracted thereto close the doors, as shown in Fig. 13. When the magnets are demagnetized, the doors open of their own weight and rest against pins 190.

Secured upon a pivot 191, carried by the side walls, is a scale-beam 192, and secured upon a suitable pivot-pin upon one end is a scale-receptacle 193, the opposite end having an adjustable weight 194. The scale-receptacle is guided in its vertical movement by guide-bars 195 and is located directly beneath the doors 186. The scale-receptacle is provided with hinged doors 197, each door having an arm 198 at one end, by which the doors are mechanically opened, the doors being spring-pressed to normally hold them in closed position.

When the separator has separated a sufficient quantity of the filler and has sufficiently filled the scale-receptacle to cause the scale-beam to reach the extremity of its inclination, electrical connections are formed which cuts off the operation of other parts of the mechanism, which will be hereinafter explained, and stops the feed of filler to the scale-receptacle.

Secured to one side wall 158 of the separator is an arm 199, and pivotally secured at the lower end of said arm at 200 is a lever 201, which carries at its outer free end a pin 202, against which arms 198 normally bear. Projecting at right angles to lever 201, adjacent to its pivotal point, is a projection 203, by which lever 201 is moved and the doors 197 opened, as shown more especially in Fig. 13. Journaled in suitable bearings carried by the frame is a shaft 204, having secured upon its inner end a pinion 205, with which the teeth of the rack-bar 182 mesh. Consequently as rock-shaft 57 is rocked a like rocking motion is transmitted to shaft 204. Pivotally secured upon the shaft 204 is an arm 206, which is normally held in a substantially vertical position, as shown in Fig. 13, by a coiled spring 207, interposed between the arm and the frame. Arm 206 is formed with an offset 208 and with a projection 209, depending from the inner wall of the offset, which is in the path of travel of a lug 210, carried by a collar 211, secured upon shaft 204, whereby as the shaft 204 is rocked arm 206 is moved from its normal position, Fig. 13, into its lowered position, Figs. 2 and 20, due to the contact of the lug 210 therewith, the reverse movement being accomplished by the spring as the shaft is rocked in an opposite direction.

Upon the outer end of arm 206 is an inwardly-extending bearing 212, Fig. 21, in which is secured a stub-shaft 213, upon which is fixedly secured a carrier-receptacle 214, which when the arm is in its raised position is located directly beneath the scale-receptacle 193 and which receives the filler after being separated and weighed, the arm 206 having a projection 215 secured thereto, which contacts with the lugs 20 of arm 201 and depresses said arm and opens the doors of the scale-receptacle when arm 206 is in raised position. The carrier-receptacle is provided with a stationary plate 216, projecting therefrom, and a door 217, pivotally secured to the receptacle-body at 218, the door having a projection 219 extending beyond its pivotal point, by which the door is opened, as will be hereinafter described, a spring 220 normally holding the door in a closed position.

Secured to the frame are two supports 221 and 222, upon which are secured bars 223, which serve as a guide for the rolling-frame 224, and screwing through the support 222 is a set-screw 225, against which the arm 206 abuts when in a raised position. The rolling-frame comprises sides 226, provided with grooves in which the bars 223 seat, Fig. 23, which are connected by a web 227, and projecting downwardly from each side 226 is a slotted projection 228, in which are housed the bearings 229 for the roller 230, the bearings and the roller being normally projected downwardly by means of springs 231, interposed between the bearings and screws 232, screwing in perforations 233 in sides 226 of the roller-frame. Projecting downwardly from one side of the roller-frame is a bifurcated hanger 234, in which is pivotally secured one end of a link 235, the opposite end of the link being pivotally secured to the free end of a lever 236, which is pivotally secured at its opposite end to a hanger 237, secured to the frame, Fig. 22, and connecting the lever 236 at a point intermediate its length and the vertical swinging bar 55 is a universal-joint coupling 238, which comprises in its elements three links, pivotally connected together and to lever 236, and vertical swinging bar 55, as shown, Fig. 22. Consequently as the swinging bar is moved lever 236 is swung on its pivot and imparts a reciprocatory movement to the rolling-frame.

Secured to the frame is a cross-piece 239, to which the table 149 is secured and supported, and extending transversely of the table is a pin 240, having secured thereon at each end disks 241, having an inclined projection 242 projecting from one side thereof, said projection being of a length to project above the rolling-table, as shown, and the wrapper is deposited upon the rolling-table in front of these projections, the object of the projection being that when the roller 230 passes over the rolling-table it is raised by the projections and drops down upon the edge of the wrapper, thus precluding the liability of the edge of the wrapper becoming folded from contact with the roller.

Journaled in bearings carried by the frame is a shaft 243, upon which is journaled a roller 244, upon which is secured a sheet of rubber-faced fabric 245, such as is ordinarily used in machines of this character, the opposite end after passing over the rolling-table being secured upon a roller 246, journaled upon a shaft 247, secured to hangers 248, depending from the frame of the machine. The rubber-coated fabric is passed through a slot 249 in the support 222 and is clamped by means of a plate 250 and set-screws 251, there being a clamping-bar 252 pivotally secured at 253 below the forward end of the rolling-table, which clamps the fabric against the under side of the table at 254. Consequently the operative portion of the rubber-faced fabric is located between the two clamping-points—the clamp just described and the clamp located on support 222 and shown more specifically in Fig. 23—one of the rollers serving as a supply-roller for the fabric, the opposite roller taking up the used portion of the same. Integral with and projecting forward from the support 222, upon each side thereof, are lugs 255, between which are journaled two rollers 256, the rubber-coated fabric passing between these rollers and over roller 230.

Secured to the rolling-frame 224 and projecting to a point between the sides thereof is an arm 257, which is in the path of travel of the projection 219 of door 217 of the carrier-receptacle. Consequently as the carrier-receptacle is lowered, Figs. 2, 13, and 20, the door is opened and the filler contained therein deposited upon the roller-belt between the door and the plate 216, the belt having a slack portion which forms a pocket into which the filler is deposited. As the arm 206 rises, the rolling-frame 224 is reciprocated, moving forwardly toward the rolling-table until the pocket formed by the belt 245 becoming contracted as the roller approaches the rolling-table until as the roller rides upon the rolling-table it is contracted to the size of the cigarette by mechanism to be presently described, the further travel of the roller over the rolling-table inclosing the filler within the wrapper in the usual manner until as the roller passes over the forward end of the table the cigarette is projected in the guideway 258 and is led into one of the pockets 259 upon the carrier-belt 260.

Secured upon the shaft 204 is a collar 261, which carries a cam 262, and pivotally secured to a projection 263, carried by the frame of the machine, is a lever 264. Journaled upon a pin carried by the lever is a roller 265, which is in vertical alinement with shaft 204 and at all times bears against the cam 262. Journaled in suitable bearings carried by the frame is a shaft 266, upon which is secured an arm 267, which is connected with the free end of lever 264 by means of a link 268, whereby when shaft 204 is rocked a rocking motion is transmitted to shaft 266 and its connections move in the arc of a circle.

Secured to shaft 266 are two arms 269, which project forwardly beyond the support 222 and are provided with two rollers 270, between which the rolling-belt is passed, the object of the construction being as the roller 230 moves forward from its position, Fig. 2, the slack in the rolling-belt is increased, as the arms 269 commence to lower at this time. As the roller, however, nears the rolling-table the rollers 270, carried by the arms 269, pass below the rollers 256 and the slack in the rolling-belt is taken up until as the roller passes onto the rolling-table the point of greatest radius of the cam 262 has depressed the arms 269 to their lowest position, only leaving a sufficient slack in the rolling-belt to house the filler and the wrapper when reduced to the size of the completed cigarette.

Depending from the frame 1 are hangers in which is journaled a shaft 271, and upon said shaft is secured a sprocket-wheel 272, around which and the sprocket-wheel 24, carried by the sleeve 8 upon shaft 6, passes a sprocket-chain 273, and by which revolution is imparted to shaft 271, arranged parallel with shaft 271, and journaled in suitable bearings carried by the frame is a shaft 274, upon which is secured a ratchet-wheel 275. Pivotally secured at 276 to a bearing depending from the frame is a lever 277, which passes beneath shaft 271, one end having one end of a link 278 pivotally secured thereto, the opposite end of the link being pivotally secured to an arm 279, loosely journaled upon shaft 274. The arm 279 carries a pawl 280, which normally engages with ratchet-wheel 275, and secured upon shaft 271 is a cam 281, which is in vertical alinement with the arm 277. Consequently as the shaft 271 is revolved a vertical swinging motion is imparted to the arm 277, which in turn imparts a revoluble movement to shaft 274, there being preferably four teeth upon ratchet-wheel 275. Consequently as ratchet-wheel 24 is revolved one turn a one-fourth revolution is imparted to shaft 274.

Secured upon shaft 274 are guide-wheels 281ª, over which runs carrier-belt 260, carrying the pockets 259, the opposite end of the belt passing over the pulleys 282, journaled upon shaft 283, located contiguous to the discharge end of the rolling-table.

Pivotally secured upon shaft 283 is a frame 284, one side of which at its free end rests upon the cam 281, the frame carrying a knife 285, which normally rests beneath the carrier-belt. (Shown in Fig. 2.)

Secured to the frame of the machine at 286 are arms 287, in the outer end of which is journaled a shaft 288, which has secured thereon rotary cutting-knives 289 and a pulley 290ª, over which and a pulley upon shaft 154 runs a belt 291, by which a continuous rotary movement is imparted to the cutting-knives. The cutting-knives are located directly above the knives 285, but at one side thereof, and as the knives 285 are raised, due to the action of the cam, the ends of the cigarette are brought between the knives and severed, it being understood that the pockets 259 are properly spaced apart to successively stop between the knives at each one-fourth revolution of the ratchet-wheel 275. After the ends of the cigarette are cut off a further revolution of the carrier-belt will carry the cigarette beyond the knives and from the machine in completed form.

I will now proceed to describe the regulating mechanism, which comprises several circuits dependent upon each other, reference being had to Figs. 24, 6, and 13, in which 292 is an electromagnet, the wires passing therefrom and contacting with set-screws 293 and 294, a battery 295 being interposed upon the wires in the usual manner. Set-screw 293 contacts with a lug 294ª, carried by the frame, to which is secured a depending arm 296, the set-screw 294 being in contact with a metallic vessel 297, which contains mercury or other fluid of a high conductivity, and resting in the mercury is an arm 298, which is normally held by its tendency to incline from contact with arm 296.

Secured to the scale-beam 192 is an arm 299, which when the load upon the scale inclines the beam contacts with arm 298, causing it to contact with arm 296, closing the circuit, and energizing magnet 292. When the magnet is energized, it attracts its armature 300, Figs. 6 and 24, which is secured upon a lever 301, pivoted centrally at 302, raising the opposite free end of the lever a slight distance, but not a sufficient distance to contact with an arm 303, arranged above the lever. Consequently when the scale has received the proper amount of filler the scale-beam will in its movement close the circuit just described and energize the magnet 292, the object of which is to slightly raise the outer end of lever 301, upon which its armature is secured. Connecting the arm 303 and lever 302 are wires which are connected to the magnet 22, heretofore described, which controls the movement of the clutch-gear mechanism to start or stop the machine. This circuit is not effected by the energizing of magnet 292, but by the coaction of the safety appliance, which has for its object to depress arm 303 to cause it to contact with the end of lever 301 when the magnet 22 is energized and the clutch-gear is free to revolve. A contact between arm 303 and lever 301 cannot be effected, however, until the magnet 292 is energized. The safety mechanism comprises a magnet 304, secured upon the top of plunger 34, said magnet being in circuit with push-button 305 within easy reach of the operator. The armatures of said magnet are secured upon catch-levers 306, the lower ends of which extend through the top of the plunger, where they are pivoted, and are provided with catches 307, a coiled spring 308 connecting the levers below their pivoted point, normally pulling the lower ends toward each other. Sliding vertically in the plunger and extending below the same are two rods 309, having a plate 310 connecting the same at their upper end, and a safety-guard 311, connecting these at their lower end, the guard being of a size to surround the punch and slide vertically thereon. Arranged in plate 310 are two openings 312, which are in alinement with the catches and which are grasped by the catches when in a raised position. Consequently as the plunger is raised the plate is also raised and is grasped by the catches, by which it is held until released by the magnet 304. Secured to and depending from the plate 310 is a plate 313, which is in alinement with arm 303 and which contacts therewith when the plate is lowered and makes the circuit and energizes magnet 22.

In the operation of the machine when the clutch-gear is stopped the plunger is in a raised position and plate 310 is grasped by the catches, when upon the operator pressing the push-button magnet 304 is energized, releasing the catches from plate 310 and allowing the safety-guard 311 to drop, which when it falls upon the die, meeting with no obstructions—as, for instance, the hand of the operator—will be in a sufficiently-lowered position to cause the pin 313 to contact with and lower the arm 303. When the machine is stationary, the mechanism is so arranged that a full charge of filler is deposited in the scale-receptacle, the scale-beam being lowered and the magnet 292 energized. Consequently as the pin 313 depresses the arm 303 contact is made with arm 301, the magnet is energized, and the arm 18 is released from its clutch mechanism, which now commences to revolve. As it makes one revolution the punch is given one reciprocation, cutting a wrapper, the carrier-wheel is revolved a one-fourth turn, the pasting mechanism—to wit, the brush—receives a complete revolution, the transfer mechanism receives one-half revolution, thus cutting a wrapper, pasting a wrapper, and transferring a wrapper to the rolling-table upon one revolution of the clutch-gear. Coincident with this operation as the clutch-gear is revolved a complete revolution rockshaft 57 is rocked, the filler-carrier for the filler is moved, a sufficient quantity of the filler is fed into the scale-receptacle, is carried to the rolling-belt, and is rolled and inclosed by the wrapper, and, further, upon a complete turn of the clutch-gear a cigarette is led between the cutting-knives, the knives are moved together, and a cigarette is completed and expelled from the machine. The wires of the magnet 189, which close and hold closed the door of the separator, are in circuit with the circuit controlled by the scale-beam, and these magnets are energized to close the doors when the scale has received its proper amount of filler and closes the circuit. The wires of the magnet 181 are also connected with this circuit. Consequently when the scale has received the proper amount of filler and closes the circuit and energizes this magnet, moves its armature, and allows the slotted table to be moved out of contact with the cylinder, cutting off the feed of filler to the scale until the scale is emptied, the scale-beam rises, the circuit is open, and the magnet demagnetized.

What I claim is—

1. In a machine for making cigarettes, rolling mechanism, and means for feeding a tobacco filler thereto, wrapper-cutting mechanism comprising a movable plunger and stationary die, and means for conveying the wrapper to the rolling mechanism comprising a revoluble carrier, clamping-arms carried by the carrier, means for projecting the carrier through the die when in alinement therewith, and in retracting the same with the cut wrapper clamped thereto, and means for imparting an intermittent revoluble motion to the carrier.

2. In a machine for making cigarettes, rolling mechanism, and means for feeding a tobacco filler thereto, wrapper-cutting mechanism, and means for conveying the wrapper to the rolling mechanism, comprising a revoluble carrier, said carrier having a plurality of arms projecting radially from its center, a catch mechanism upon the outer end of each of the arms, means for operating the catches, to grasp and release the wrapper, and means for imparting an intermittent revoluble motion to the carrier.

3. In a machine for making cigarettes, rolling mechanism and means for feeding a tobacco filler thereto, wrapper-cutting mechanism and means for conveying the wrapper to the rolling mechanism, comprising a revoluble carrier having a plurality of carrier-arms, means for imparting an intermittent revoluble motion to the carrier, and a transfer mechanism for conveying the wrapper from the carrier to the rolling mechanism and means for operating the same while the carrier is stationary as regards its revoluble movements.

4. In a machine for making cigarettes, rolling mechanism, and means for feeding a tobacco filler thereto, wrapper-cutting mechanism and means for conveying the wrapper to the rolling mechanism, comprising a carrier having a plurality of arms projecting radially therefrom, each carrying a catch, means for imparting an intermittent revoluble motion to the carrier, catches upon the carrier to engage with the wrapper, a transfer mechanism for conveying the wrapper to the rolling-table, and means for disengaging the catches from the wrapper simultaneously with the operation of the transfer mechanism.

5. In a machine for making cigarettes, rolling mechanism and means for feeding a tobacco filler thereto, wrapper-cutting mechanism, and means for conveying the wrapper to the rolling mechanism, comprising a revoluble carrier, means for moistening one edge of the wrapper while upon the carrier, and a transfer mechanism for transferring the wrapper to the rolling mechanism, said mechanism engaging with the wrapper by adhesion of the moistened edge thereof.

6. In a machine for making cigarettes, a rolling mechanism and means for feeding a tobacco filler thereto, wrapper-cutting mechanism, and means for conveying the wrapper to the rolling mechanism, comprising a carrier, and means for revolving the same, a transfer mechanism for transferring the wrapper to the rolling mechanism, said transferring mechanism comprising plates, revolving in alinement with the edge of the wrapper when upon the carrier, and means for imparting movement to the plates.

7. In a machine for making cigarettes, rolling mechanism and means for feeding a tobacco filler thereto, wrapper-cutting mechanism comprising a vertically-movable plunger, a punch carried by the plunger, a supplemental plunger guided by the plunger to which the arm is pivotally secured, a catch carried by the plunger to engage with the supplemental plunger upon one of its movements and means for releasing the catch when the punch-bar has reached the limit of its movement and before the supplemental plunger has completed its movement in the same direction, a carrier located beneath the punch, mechanism upon the carrier actuated by the supplemental plunger for engaging the wrapper after being punched, and means for transferring the wrapper from the carrier to the rolling mechanism.

8. In a machine for making cigarettes, rolling mechanism and means for feeding a tobacco filler thereto, wrapper-cutting mechanism, and means for conveying the wrapper to the rolling mechanism, comprising a carrier formed with a plurality of radial arms, a bar arranged longitudinally of each of the arms, a plate carried by each bar, clamps to secure the wrapper to the plate, a paste-receptacle, a paste-plate and means for swinging the same from a point within the paste-receptacle to a point above the same and vice versa, a paste-brush, and means for revolving the brush to contact with the paste-plate and with the edge of the wrapper.

9. In a machine for making cigarettes, a die composed of a plurality of knives, each arranged at right angles to the adjacent knife, one end of each knife being at an acute angle to the cutting edge thereof.

10. In a machine for making cigarettes, wrapper-cutting mechanism comprising a vertically-reciprocating punch and means for reciprocating the same, and a die formed with a plurality of knives, one end of each knife abutting against the cutting edge of the adjacent knife whereby an opening is formed in cross-sectional area equal to the surface of the face of the punch.

11. In a machine for making cigarettes, a wrapper-cutting mechanism having as an element a die, a wrapper-carrier reciprocating through the die and receding with the cut wrapper held thereon, and means for releasing the wrapper.

12. In a machine for making cigarettes, a reciprocating plunger, a punch carried by the plunger, a rod guided by the plunger and having a vertical movement therein, means for reciprocating the rod, a catch carried by the plunger frictionally engaging with the rod, and means for disengaging the catch from the rod when the plunger has reached the lowest limit of its reciprocation, and a supplemental plunger carried by the rod.

13. In a machine for making cigarettes, a power-shaft and means for continuously revolving the same, a vertically-reciprocating punch, a safety-guard carried thereby and free to move vertically from a point above the cutting edge of the punch, to a point below the same, means for normally holding the guard in a raised position and means under control of the operator for releasing the guard, and allowing it to drop by gravity, and a clutch mechanism interposed between the power-shaft and the punch-operating mechanism controlled primarily by the fall of the guard.

14. In a machine for making cigarettes, a power-shaft and means for continuously revolving the same, tobacco-filler feeding and rolling mechanism and wrapper-cutting mechanism actuated thereby, a clutch mechanism interposed between the power-shaft and the said mechanism, normally operating to stop the said mechanism, a safety mechanism carried by the cutting mechanism under control of the operator comprising a guard adapted to fall in advance of the cutting mechanism, the clutch mechanism being operated by the guard when at the extremity of its lowest movement, substantially as described.

15. In a machine for making cigarettes, rolling mechanism and means for feeding a cut wrapper thereto, tobacco-filler-feeding mechanism a separator into which the filler is fed the separator comprising a continuously-revolving cylinder, radial knives on the cylinder, a table arranged above the cylinder having slots arranged in alinement with the knives of the cylinder, and means for automatically moving the table to and from the knives.

16. In a machine for making cigarettes, a separator having doors normally held open by gravity, electromagnets closing the doors when the magnets are energized, a scale located below the separator, with which the magnets are in circuit, and means for closing the circuit when the scale has received a predetermined amount of filler, rolling mechanism and means for conveying the filler thereto.

17. In a machine for making cigarettes, a scale-receptacle and means for feeding a tobacco filler thereto, doors in the scale-receptacle normally held in closed position, rolling mechanism, and means for conveying the filler from the scale-receptacle to the rolling mechanism, comprising a rock-shaft and means for rocking the same, an arm pivotally secured upon the shaft normally held in a substantially vertical position, a lug fixedly arranged upon the shaft adapted to move the arm when the shaft is rocked, a carrier-receptacle carried by the arm, and means upon the arm to open the doors of the scale-receptacle when the arm is in its raised position.

18. In a machine for making cigarettes, a rolling mechanism comprising, as an element a rolling-belt composed of a continuous strip of rolling-belt material, clamps for securing the same at each end of the rolling mechanism, and supply and take-up rollers for the belt, located beyond the clamps.

19. In a machine for making cigarettes, rolling mechanism comprising a table and a reciprocating roller, means for reciprocating the roller, a rock-shaft and means for rocking the same, arms upon the shaft and rollers carried by the arms, through which the rolling-belt passes, said arms and rollers constituting a slack-take-up for the belt.

20. In a machine for making cigarettes, a power-shaft, wrapper-cutting, filler feeding and rolling mechanism operated thereby, a safety-guard normally held in a raised position, an electromagnet for releasing the guard when energized, and means under control of the operator for energizing the magnet, and a clutch interposed between the power-shaft and the several mechanisms heretofore mentioned operated by the guard.

21. In a machine for making cigarettes, means for controlling the movement thereof, comprising a clutch, a safety mechanism, and weighing mechanism an electromagnet for engaging the clutch when said electromagnet is energized, a normally open circuit upon which said magnet is secured means for closing the circuit, comprising a safety-catch under control of the operator, and a normally open circuit closed by the weighing mechanism.

In testimony whereof I hereby affix my signature in presence of two witnesses.

ALFRED H. RANDALL, Jr.

Witnesses:
E. V. M. BRENNAN,
WILLIAM WEBSTER.